United States Patent [19]

Ichiyanagi

[11] 4,326,784
[45] Apr. 27, 1982

[54] INFORMATION DISPLAY DEVICE FOR CAMERA

[75] Inventor: Toshikazu Ichiyanagi, Mitaka, Japan

[73] Assignee: Canon Kabushiki Kaisha, Tokyo, Japan

[21] Appl. No.: 120,920

[22] Filed: Feb. 12, 1980

[30] Foreign Application Priority Data

Feb. 16, 1979 [JP] Japan .................................. 54-16956

[51] Int. Cl.³ ............................................ G03B 17/20
[52] U.S. Cl. .................................... 354/53; 354/60 L; 354/198; 354/286; 354/289
[58] Field of Search ..................... 354/53, 60 E, 60 L, 354/289, 198, 286, 46

[56] References Cited

U.S. PATENT DOCUMENTS

| | | | |
|---|---|---|---|
| 4,188,713 | 10/1978 | Murakami et al. | 354/289 X |
| 4,192,590 | 3/1980 | Kitaura | 354/53 |
| 4,239,358 | 12/1980 | Ohtsubo et al. | 354/289 X |
| 4,244,643 | 1/1981 | Tokutomi | 354/289 X |

Primary Examiner—Michael L. Gellner
Attorney, Agent, or Firm—Toren, McGeady & Stanger

[57] ABSTRACT

The disclosed device responds to the focal length of a camera's lens to display a first range of shutter times at which a camera can safely be held manually and a second range in which it cannot, and also displays the exposure controlling time. The shutter time for producing an exposure is displayed and compared with these ranges to determine whether the camera can safely be hand held.

20 Claims, 6 Drawing Figures

INFORMATION DISPLAY DEVICE FOR CAMERA

BACKGROUND OF THE INVENTION

1. Field of the Invention

The present invention relates to an information display device for displaying information necessary for taking a photograph in a camera viewfinder.

2. Description of the Prior Art

Until now it has been common to display the shutter time, the aperture value, and so on in the viewfinder of a camera. It is essential, particularly for a camera with automatic exposure control, to display a proper exposure value. In addition, conventional cameras also include display alarms which indicate when the amount of light is beyond the available exposure control range, a display for flash photography, and so on, but other data convenient for taking a photograph are rarely displayed.

Besides the above facts, there are many other values which the photographer has to select and confirm before taking a photograph. Among these are the picture angle, the exposure aperture, a shutter time for the safety manual camera holding range and finally, the focal length of the lens.

The picture angle is displayed in the sight field of the viewfinder and can satisfactorily be confirmed in a single lens reflex camera with an efficient viewfinder. As for the selection of the exposure amount, the combination of the shutter time with the aperture value for proper exposure is automatically calculated and displayed in the viewfinder in many modern automatic exposure control cameras. The exposure value is calculated only for the ASA sensitivity of the film in the camera, regardless of the latitude of the film. However, there is no display for judging the exposure factor when one wishes to overexpose or underexpose an object. Also, there is no display showing a safe manual camera holding range of shutter times based on the focal length of the lens mounted when the camera is hand-held.

To determine the focal depth of the lens, it is necessary to use the scale provided on the lens barrel. This is inconvenient to do after the lens has been focused so that an operator rarely bothers to find or confirm this value.

Consequently, although the selection of the picture angle can be made visually by looking through the viewfinder, other functions, such as the selection of the exposure amount, the selection of the shutter time within the safe manual camera holding (i.e., hand held) range and confirmation of the focal depth require other means such as reading the scales on a setting member outside the viewfinder.

A purpose of the present invention is to offer a device by means of which the shutter time range in the safe manual camera holding limit is displayed in accordance with the focal length of the photographic lens, while the shutter time value for controlling the exposure is also displayed, and by comparing both of the above displays, it may easily be determined whether the shutter time is in the safe manual camera holding range.

Another purpose of the present invention is to offer a device which displays the allowable exposure range in accordance with the kind of film, while the exposure value for controlling the exposure is displayed. By comparing these two displays, it may easily be determined whether the exposure value is in the exposure amount allowance range.

Further, another purpose of the present invention is to offer a device which displays the focal depth range in accordance with the aperture value information as well as with the distance information. The distance is displayed in accordance with the distance information, and by comparing the two displays, one can easily judge whether the distance is in the focal depth range.

DESCRIPTION OF THE PREFERRED EMBODIMENTS

Figure 1:
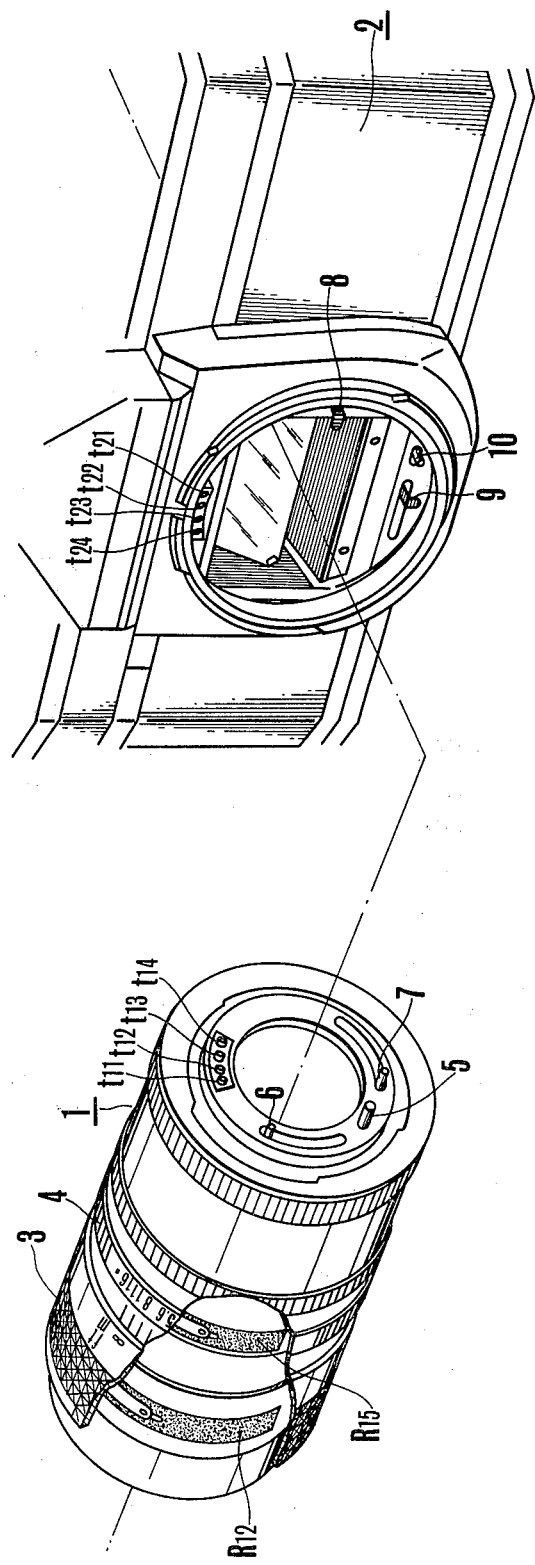
FIG. 1 shows the outside of an embodiment of the camera in accordance with the present invention.

Below, the present invention will be explained in detail in accordance with the drawings of an embodiment. The outside of the camera is shown in FIG. 1, in which numeral 1 denotes or represents an interchangeable lens and numeral 2, a camera body. The interchangeable lens 1 has a distance setting ring 3 and an aperture setting ring 4. The slide element of a variable resistor R12 is moved in accordance with the distance setting by the distance ring 3. The signal in accordance with the value of the variable resistor R12 is transferred to the camera body 2 through terminals t11 and t12 and terminals t21 and t22. Further, in accordance with the aperture value of the aperture value setting ring 4, the slide member of a variable resistor R15 is moved. The signals in accordance with the variable resistor R15 are transferred to the camera body 2 through terminals t13 and t14 and terminals t23 and t24. The height of a pin 5 changes in accordance with the focal length of the interchangeable lens. The camera body 2 presents an aperture value signal lever 8 to be engaged with an aperture value preset lever 6 and an automatic diaphragm closing lever 9 to be engaged with a diaphragm driving lever 7. A movable member 10 is pushed in accordance with the height of the pin 5, so that the slide member of a variable resistor R11 is moved in accordance with the amount of movement of the member 10.

Figure 2:
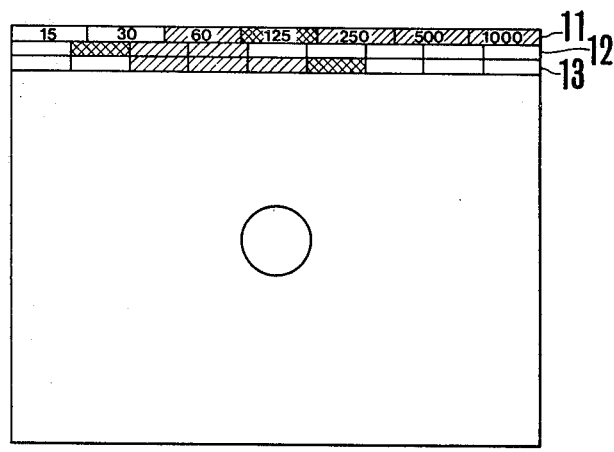
FIG. 2 shows the sight field of the viewfinder of the camera shown in FIG. 1.

The finder view field of the camera shown in FIG. 1 is shown in FIG. 2. Inside or outside of the finder view field, a shutter time display part 11, an exposure amount display part 12 and a distance display part 13 can be visually recognized. The display part 11 displays the range of the shutter times suitable for a hand held camera. When the shutter time falls within this range, a nice picture can be taken even when the camera is manually held. The display part 12 displays the allowable range of the exposure amount representing the latitude of the loaded film. When the exposure amount is within this range, a suitable picture can be obtained. The display part 13 displays the range of the focal depth so that when the distance is within this range, a suitable picture can be obtained. In order to carry out the above display, the display part 11 is divided into 7 areas, while the display parts 12 and 13 are divided into 9. These display parts carry out the calculation and the display, the following conditions being taken into consideration. Namely, when the camera is manually held, the longest shutter time T in which a suitable picture can be taken is reciprocally proportional to the focal length (fo) of the mounted lens. Namely, when the focal length of the mounted lens is fo mm, the longest safe shutter time T is represented by 1/fo sec. The safe shutter time range covers the time smaller than T. For example, when a standard 50 mm focal length lens is mounted on the camera, the range of the shutter times shorter than 1/50 sec., in practice 1/60 sec., is displayed brightly. In the drawing, the shutter times are shown as decreasing from left to right. While not shown in the drawing, a vertical line is varied according to shutter times.

The range of the exposure amount allowance depends upon the sensitivity of the loaded film. In the case of normal photographic film, the higher the film sensitivity is, the wider the latitude is. Namely, for normal black and white negative film or color negative film, the higher the ASA sensitivity is, the wider the film latitude. Consequently, the latitude can be obtained by calculating the ASA information of the film, while the set exposure amount can be obtained from the measurement output (B) proportional to the object brightness, the aperture value F, and the shutter time T in accordance with the relation $$X = KB/F^2 T.$$

Then, the focal depth depends upon the reciprocal 1/fo of the focal length fo of the lens and the position $\theta$ of the aperture setting and the distance setting ring, and cannot be represented by means of an equation in a general way. Thus, the combination of these numerical values is read out from the ROM of the computer.

Figure 3:
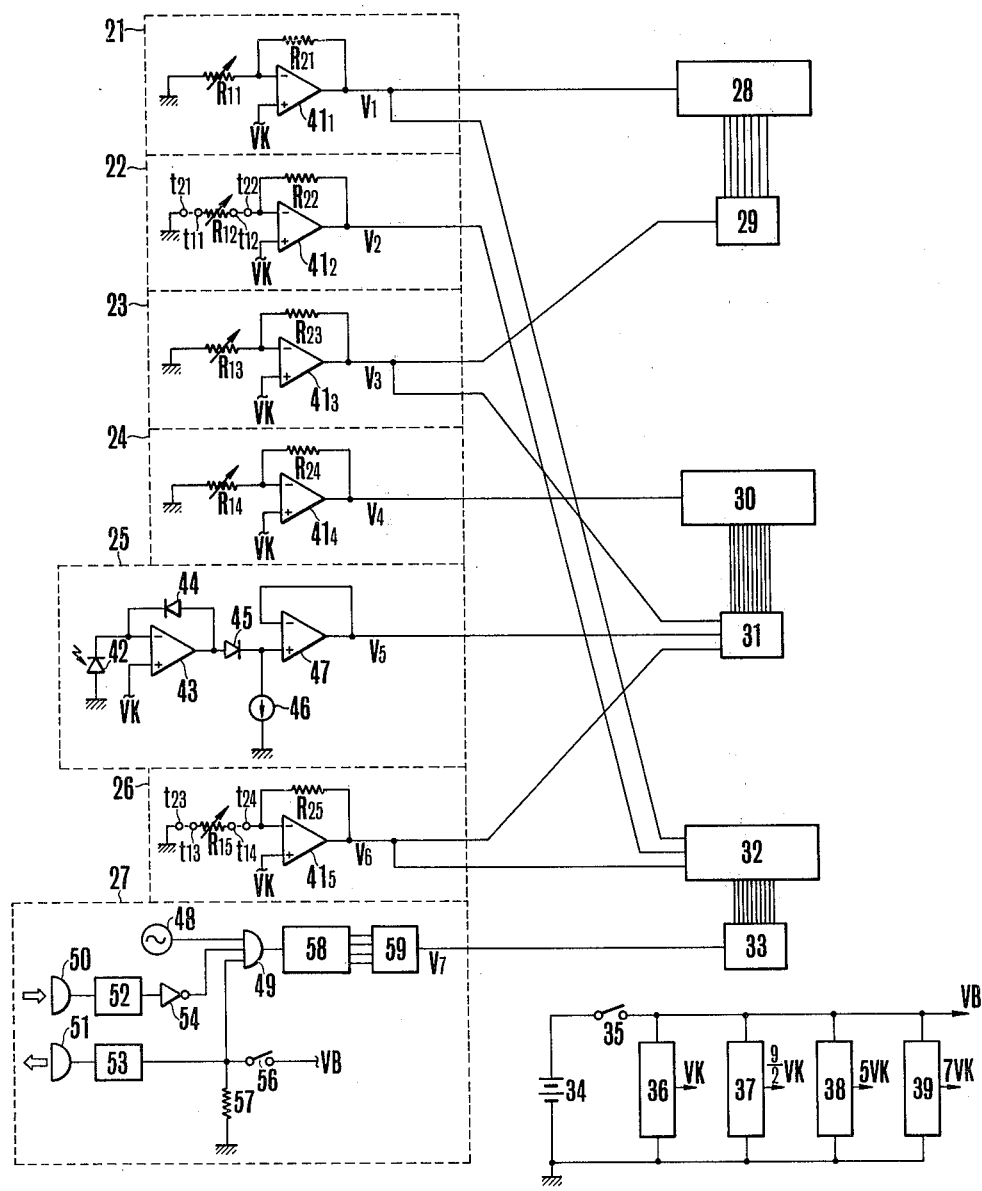
FIG. 3 shows the electrical circuits of the display devices of the camera shown in FIG. 1.

An electrical circuit for the above display devices is shown in FIG. 3. A signal source of the focal length (fo) of the lens is represented by numeral 21, a signal source for the rotation angle ($\theta$) of the distance adjusting ring of the lens by 22, and a signal source of the shutter time (T) by 23. A signal source of the film sensitivity (S) is denoted by numeral 24, a signal source of the object brightness by 25, a signal source of the aperture value (F) by 26, and a signal source for the distance (L) from the film plane to the object, by numeral 27. Further, a display circuit 28 displays the range of the safe shutter time, a display circuit 29 displays the shutter time, and a display circuit 30 displays the range of the exposure amount allowance. Display circuits 31, 32 and 33 display the exposure amount, the range of the focal depth, the distance to the object, respectively.

A power source is represented by numeral 34. When a main switch 35 is closed, a source voltage VB is applied to the operational amplifiers and circuits. Further, the power source 34 is connected in parallel with a first constant voltage circuit 36, a second constant voltage circuit 37, a third constant voltage circuit 38 and a fourth constant voltage circuit 39 through the main switch 35. The first, second, third and fourth constant voltage circuits, respectively, produce the constant voltages VK, (9/2)VK, 5VK and 7VK.

The aforementioned signal source 21 is composed of an operational amplifier $41_1$ to whose non-inverting input terminal a constatnt voltage VK is applied, a variable resistor R11 connected to the inverting input terminal of the operational amplifier $r1_1$, and a resistor R21 connected between the non-inverting input terminal and the output terminal of the operational amplifier. As mentioned, the variable resistor R11 is operatively engaged with the movable member 10 so as to determine the value of resistance in accordance with the focal length of the interchangeable lens. From the output of the operational amplifier $41_1$, a signal V1=VK (1+R12/R11) is delivered. The signal sources 22, 23 and 24 are constructed in the same way as the signal source 21. The value of the variable resistor R12 of the signal source 22 is set in accordance with the adjustment of the distance setting ring 3. The value of a variable resistor R13 of the signal source 23 is set in accordance with the adjustment by means of the shutter time setting dial. The value of a variable resistor R14 of the signal source 24 is set with the adjustment of the film sensitivity setting dial. As mentioned, the value of the variable resistor R15 of the signal source 26 is set with the adjustment of the aperture value setting ring 4. The outputs of the operational amplifiers $41_1$, $41_2$, $41_3$, $41_4$ and $41_5$ are respectively set in accordance with the resistance values set at variable resistors R11, R12, R13, R14 and R15.

The signal source 25 is the light measuring circuit which produces an output in accordance with the object brightness. A light sensor 42 measures the object brightness. Numeral 43 represents an operational amplifier to which the constant voltage VK is applied, 44 denotes a compressing diode, 45 a diode, 46 a constant current circuit and 47 an operational amplifier.

The signal source 27 is the distance measuring device, making use of ultra sonic waves. Numeral 48 denotes a clock oscillator, and 49, an AND gate. An ultra sonic wave receiver 50 receives the ultra sonic (ultrasonic) wave emitted from an oscillator 51 and reflected from the object.

A waveform reforming circuit 52 has an output whose level goes high ("H") when the ultra sonic wave is received. Numeral 54 represents an inverter, 53 an ultra sonic wave oscillator, 51 a driving circuit and 56 a distance measuring switch. When the switch 56 is closed, a voltage VB is applied to the connecting point between the AND gate 49 and a resistor 57 so as to actuate the ultra sonic wave oscillator 53 and also to apply a high signal to the AND gate 49. The AND gate 49 allows the passage of the clock pulses while the ultra sonic wave is emitted from the camera, reflected from the object, and reaches the camera. A counter is represented by numeral 58, and a D/A converter by 59.

Figure 4:
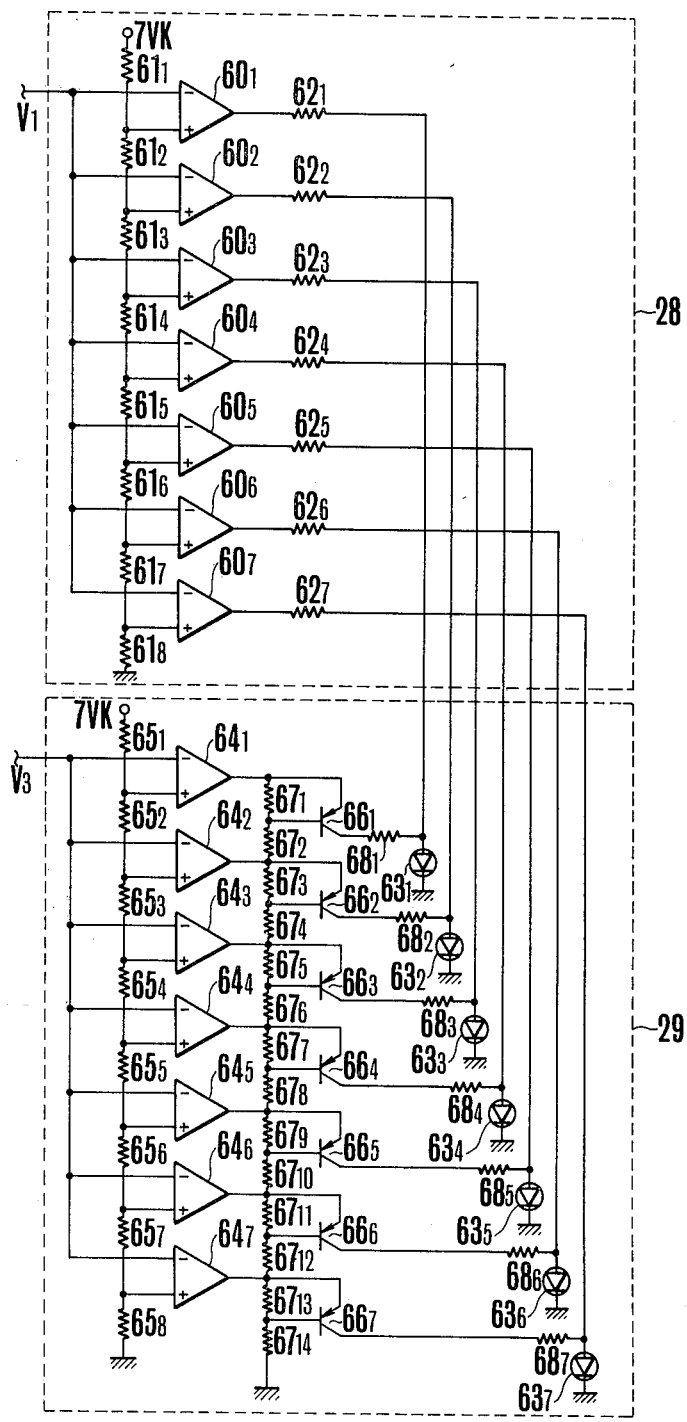
FIG. 4 shows the display circuit for showing the shutter time display part shown in FIG. 3.

FIG. 4 shows the display circuits 28 and 29 in detail. In the display circuit 28, $60_1$, $60_2$, ... $60_7$ respectively represent operational amplifiers, $61_1$, $61_2$, ... $61_8$ denote respectively voltage dividing resistors, and $62_1$, $62_2$ ... $62_7$ represent resistors connected in series. The outputs of the operational amplifiers $60_1$, $60_2$, ... $60_7$ are respectively connected to LED's $63_1$, $63_2$, ... $63_7$ of the display circuits through the resistors $62_1$, $62_2$, ... $62_7$. The voltage dividing resistors $61_1$ and $61_8$ are set at $\gamma$, while the voltage dividing resistors $61_2$ ... $61_7$ are set at $2\gamma$. Consequently, when the 7VK is applied to the positive side, the voltages at the voltage dividing points are ½VK, 3/2VK, 5/2VK, 7/2VK, 9/2VK, 11/2VK and 13/2VK, seen from the earth side. When the input voltage V1 is equal to 6VK, only the potential 13/2VK at one of the above voltage dividing points is higher than 6VK. Thus, only the output of the operational amplifier $60_1$ is high in level, and only the LED $63_1$ lights up or illuminates. When the input voltage V1 is equal to 5VK, the potentials 13/2VK and 11/2 VK at the two of the above-mentioned voltage dividing points is higher than 5VK. Consequently, the output of the operational amplifier $60_1$ and $60_2$ are high in level so that the LEDs $63_1$ and $63_2$ light up.

In the display circuit 29, numerals $64_1$, $64_2$, ... $64_7$ represent operational amplifiers, $65_1$, $65_2$, ... $65_8$ denote voltage dividing resistors, $66_1$, $66_2$, ... $66_7$ denote transistors, and $67_1$, $67_2$, ... $67_{14}$, bias resistors. The collectors of the transistors $66_1$, $66_2$, ... $66_7$ are respectively connected to the LED's through resistors $68_1$, $68_2$, ... $68_7$. The voltage dividing resistors $65_1$ and $65_8$ are set at $\gamma$, while the voltage dividing resistors $65_2$ ... $65_7$ are set at $2\gamma$. Consequently, when the voltage 7VK is applied to the positive side, the potentials at the voltage dividing points are $\frac{1}{2}$VK, 3/2VK, 5/2VK, 7/2VK, 9/2VK, 11/2VK and 13/2VK above ground. When the input voltage V3 is now equal to 6VK, only the potential 13/2VK at one of the voltage dividing points is higher than 6VK. Thus, only the output of the operational amplifier $64_1$ is high in level so that only the transistor $61_1$ is brought into the closed state to illuminate the LED $63_1$. When the input voltage V1 is equal to 5VK, the potentials 13/2VK and 11/2VK at two of the voltage dividing points are higher than 5VK. Thus, the output of the operational amplifiers $64_1$ and $64_2$ are high in level so that only the transistor $66_2$ is turned on to light up the LED $63_2$.

Figure 5:
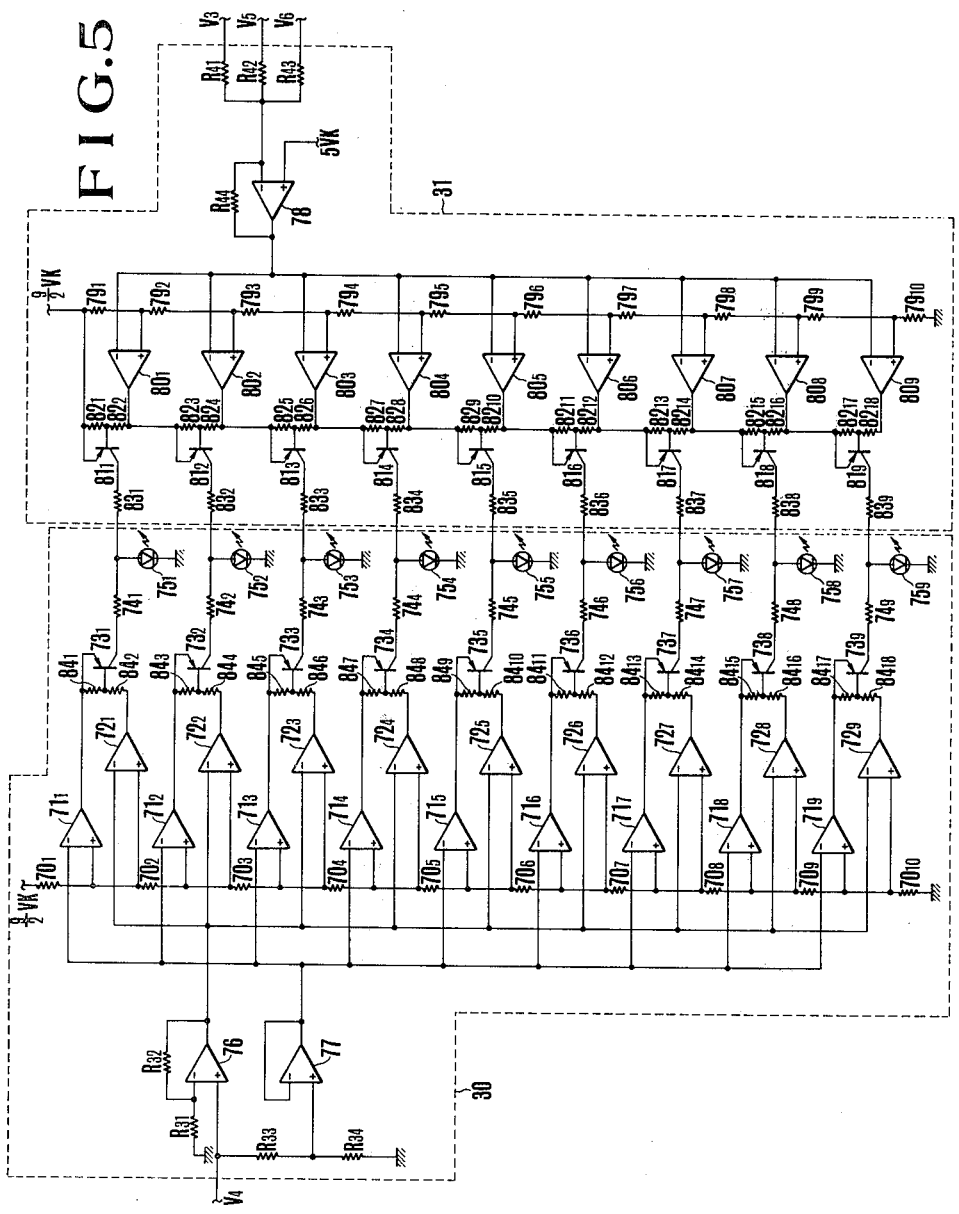
FIG. 5 shows the display circuit for showing the exposure amount display part shown in FIG. 3.

FIG. 5 shows the display circuits 30 and 31 of FIG. 3. In the display circuit 30, numerals $70_1$, $70_2$, ... $70_{10}$ as well as $72_1$, $72_2$, ... $72_9$ denote operational amplifiers. Numerals $73_1$, $73_2$, ... $73_9$ denote transistors. Numerals $84_1$, $84_2$, ... $84_{18}$ as well as numerals $74_1$, $74_2$, ... $74_9$ represent resistors, and numerals $75_1$, $75_1$, ... $75_9$ denote LED's. Numerals 76 and 77 represent operational amplifiers in the input circuit, and R31, R32, R33 and R34 the resistances in the circuit. When the input to the circuit is V4, the outputs V76 and V77 of the operational amplifiers 76 and 77 are obtained as follows:

$$V76 = V4(1 + R32/R31)$$

$$V77 = V4(1 - R34/R33 + R34).$$

When $R31 = R32 = R33 = R34$, V 76 = 2VD while $V77 = VD/2$. The aforementioned voltage dividing resistors $70_1$ and $70_{10}$ are set at $\gamma$, while the voltage dividing resistors $70_2$–$70_9$ are set at $2\gamma$. When 9/2VK is applied to the positive side, the potentials at the voltage dividing points are $\frac{1}{4}$VK, $\frac{3}{4}$VK, 5/4VK, 7/4VK, 9/4VK, 11/4VK, 13/4VK, 15/4VK and 17/4VK above ground. Consequently, an input voltage VD is equal to VK, V76=2VK while V77=VK/2, so that the outputs of the operational amplifiers $71_1$–$71_8$ are high in level, while only the output of the operational amplifier $71_9$ is low in level. Further, the outputs of the operational amplifiers $72_1$–$72_5$ are high, while the outputs of the operational amplifiers $72_6$–$72_9$ are low. Consequently, the transistors $73_6$, $73_7$ and $73_8$ are rendered conductive to illuminate the LED's $75_6$, $75_7$ and $75_8$.

In the display circuit 31, numeral 75 denotes an operational amplifier to which a constant voltage 5VK is applied, and numerals R41, R42, R43 and R44 represent resistors. Numerals $79_1$, $79_2$, ... $79_{10}$ denote voltage dividing resistors, $80_1$, $80_2$, ... $80_9$ denote operational amplifiers, $81_1$, $81_2$, ... $81_9$ denote transistors, $82_1$, $82_2$, ... $82_{18}$ represent bias resistors, and numerals $83_1$, $83_2$, ... $83_9$, resistors. The aforementioned voltage dividing resistors $79_1$ and $79_{10}$ are set at $\gamma$, while the voltage dividing resistors $79_2$–$79_9$ are set at $2\gamma$. Consequently, when 9/2VK is applied to the positive side, the potentials at the voltage dividing points are $\frac{1}{4}$VK, $\frac{3}{4}$VK, 5/4VK, 7/4VK, 9/4VK, 11/4VK, 13/4VK, 15/4VK and 17/4VK above ground. When the output voltage of the operational amplifiers 78 is VK, the output of the operational amplifiers $80_1$–$80_7$ are high in level, while the output of the operational amplifiers $80_8$ and $80_9$ are low in level. Thus, only the transistor $81_8$ is turned on to light up the LED $75_8$.

Figure 6:
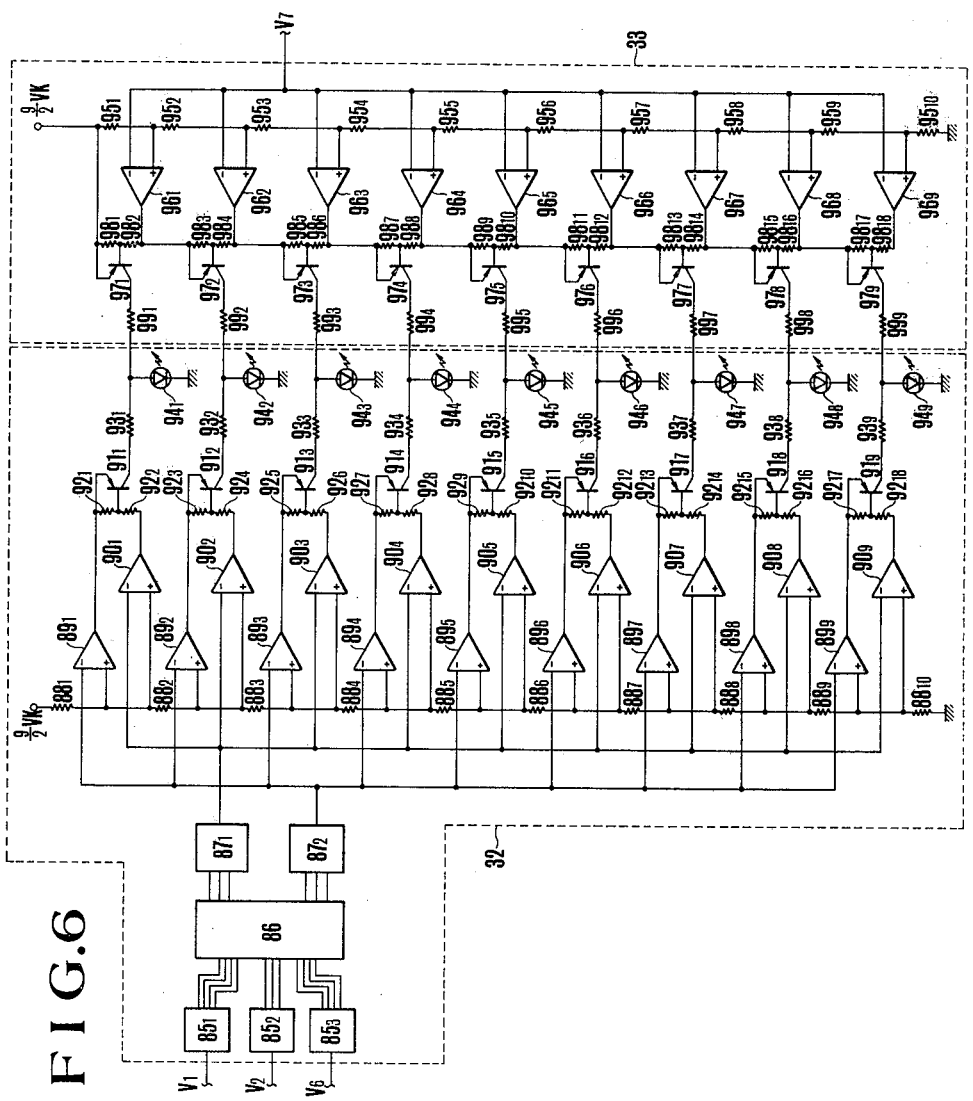
FIG. 6 shows the display circuit for showing the focal depth display part shown in FIG. 3.

A detailed rendering of the display circuits 32 and 33 is shown in FIG. 6. In the display circuit 32, numerals $85_1$, $85_2$, and $85_3$ represent A-D converters, 86 a ROM (Read Out Memory) and $87_1$ and $87_2$ represent D-A converters. Numerals $88_1$, $88_2$, ... $88_7$ represent voltage dividing resistors, while numerals $89_1$, $89_2$, ... $89_9$ as well as $90_1$, $90_2$, ... $90_9$ denote operational amplifiers. Numerals $91_1$, $91_2$, ... $91_9$ represent transistors, numerals $92_1$, $92_2$, ... $92_{18}$, bias resistors, numerals $93_1$, $93_2$, ... $93_9$ resistors, and numerals $94_1$, $94_2$, ... $94_9$ denote LED's. Numerals $95_1$, $95_2$, ... $95_{10}$ denote voltage dividing resistors, numerals $96_1$, $96_2$, ... $96_9$ denote operational amplifiers, $97_1$, $97_2$, ... $97_9$, transistors, $98_1$, $98_2$, ... $98_{18}$ bias resistors, and $99_1$, $99_2$, ... $99_9$ resistors. The light emission control circuits for the LED's $94_1$, $94_2$, ... $94_9$ are constructed in the same way as is shown in FIG. 5.

In operation, when the interchangeable lens 1 is mounted on the camera body 2, the terminals t11, t12, t13 and t14 are respectively brought in contact with the terminals t21, t22 and t24, and the variable resistors R12 and R15 are connected to the operational amplifiers $41_2$ and $41_5$. Further, the pin 5 moves the member 10, which moves the slide member of the variable resistor R11. This determines the value of the movable resistor R11. When, then, the main switch 35 is closed, the source voltage VB and the constant voltage are applied to the corresponding parts. For example, when the interchangeable lens 1 is a standard lens with the focal length of 50 mm, the projection of the pin is constructed so that the output voltage V1 of the operational amplifier $41_1$ is 2VK(V1=2VK). Consequently, the outputs of the operational amplifiers $60_1$, $60_2$, ... $60_5$ are high, while the output of the operational amplifiers $60_6$, $60_7$ are low. Thus, the LED's $63_1$, $63_2$, ... $63_5$ are lit up, while the LED's $63_6$ and $63_7$ remain unlit. In this way, this state is displayed in the viewfinder, as shown at the display part 11 in FIG. 2.

When, for example, the shutter time dial is set at 1/125, the output voltage V3 of the operational amplifier $41_3$ is 4VK so that the output of the operational amplifier $64_4$ is high, whereby only the transistor $66_4$ is rendered conductive and the LED $63_4$ lights up the portion 1/125 of the display part 11 in FIG. 2. Thus, the LED's $63_1$, $63_2$, $63_3$, $63_4$ and $63_5$ illuminate to show the range in which a suitable picture can be taken even if the camera is manually held. In addition, the LED $63_4$ lights up in order to display the shutter time, so that more current is added to the LED $63_4$ to illuminate it more brightly. Thus, it is displayed when the set shutter time is in the range in which a suitable picture can be taken, even if the camera is held by hand. On the other hand, when the shutter time is set outside of the range in which a suitable picture can be taken, the LED $63_7$ or $63_6$ lights up. When the LED $63_7$ lights up, the LED $63_6$ is extinguished so that it can easily be understood that the set shutter time is outside of the range in which a suitable picture can be taken. On the other hand, when the LED $63_6$ lights up, it assumes the state in which it is in operative engagement with the LED's $63_1,-63_5$. However, there is no LED which lights more brightly than others, from which it can be understood that the set shutter time is out of the range in which a suitable picture can be taken.

When then the film sensitivity setting dial is set at ASA 100, the value of the variable resistance is set in such a manner that the output voltage V4 of the operational amplifier $41_4$ is VK. Thus, the output voltage of the operational amplifier 76 is 2VK, while the output voltage of the operational amplifier 77 is VK/2. Consequently, the transistors $73_6$, $73_7$ and $73_8$ are brought into the closed state to light up the LED's $75_6$, $75_7$, and $75_8$ as shown at the display part in FIG. 2. When then the aperture value setting ring 4 is set at the desired aperture value, the value of the variable resistor R15 is correspondingly determined. The output voltage V6 of the operational amplifier $41_5$ is determined in accordance with the set aperture value. Further, the operational amplifier 47 produces a voltage V5 in accordance with the object brightness. The operational amplifier 78 calculates the shutter time information, the brightness information and the aperture value information, which are the outputs of the operational amplifiers $41_3$, 47 and $41_5$. When the output voltage of the operational amplifier 78 is VK, the transistor $81_8$ is brought into the closed state so as to light up the LED $75_8$, as shown at the display part in FIG. 2. In this way, it can be understood that the exposure value is in the exposure amount allowance range.

Further, in the case that the output voltage of the operational amplifier 78 is 3VK, the output of the operational amplifiers $80_1$, $80_2$ and $80_3$ are high in level, while the ouputs of the operational amplifiers $80_4$–$80_9$ are low in level. Thus, the transistor $81_4$ is brought into the closed state to light up the LED $75_4$. Thus, the LED $75_4$ lights up while the LED's $75_6$, $75_7$ and $75_8$ remain unlit, from which it can be understood that exposure value is outside of the exposure amount allowance range. At this time, both the shutter time and the aperture value, or either of them, is reset so that the exposure value comes into the exposure amount allowance range.

When, then, through operating the distance setting ring 3, the distance to the object is set, the value of the variable resistor R12 is set in accordance with it. Thus, the output voltage V2 of the operational amplifier $41_2$ is decided. The outputs of the operational amplifiers $41_1$, $41_2$, $41_5$ are respectively delivered to the A-D converters $85_1$, $85_2$ and $85_3$ and converted into digital signals as the information for the focal length of the lens, for the rotation angle of the distance setting ring, and for the aperture value. All of this information is put into the ROM 86. The ROM reads out the content (lens data) input in the respective address in advance so as to produce two series of digital signals for determining the focal depth, and delivers them as analog signals from the D-A converter $87_1$, $87_2$. When the output voltage of the D-A converter $87_1$ is 3VK, while the output voltage of the D-A converter $87_2$ is VK, the outputs of the operational amplifiers $89_1$–$89_7$ are high in level, while the outputs of the operational amplifiers $89_8$ and $89_9$ are low in level. Further, the outputs of the operational amplifiers $90_1$, $90_2$ and $90_3$ are high in level, while the outputs of the operational amplifiers $90_4$–$90_9$ are low in level. Thus, the transistors $91_4$–$91_7$ are brought into the closed state so as to light up the LED's $94_4$–$94_7$ as is shown at the display part 13 in FIG. 2. In order to confirm whether a subordinate object near the main object is in the range of the focal depth, the camera is directed from the main object to the subordinate object and the distance setting switch 56 is operated. Then the ultra sonic wave from the oscillator 53 operates so as to produce an ultra sonic wave from the oscillator 51. The ultra sonic wave is reflected and received by the receiver 50, and the wave reforming circuit 52 produces a high level output, which is inverted by the inverter 54 so as to bring the AND gate 49 into the non-operative state. Thus, the number of pulses of the clock oscillators 48 during the period in which the ultra sonic wave is sent and received, is counted by means of the counter 58. Obviously, the count number of the counter 58 varies in accordance with the distance between the camera and the object. When the output of the counter 58 is converted into analog voltage by means of the D-A converter 59, that voltage represents the object distance. When the output voltage V7 of the D-A converter 59 is 3VK, the outputs of the operational amplifiers $96_1$, $96_2$ and $96_3$ are high in level, while the output of the operational amplifiers $96_4$–$96_9$ are low in level. Thus, the transistor $97_4$ is brought into the closed state to light up the LED $94_4$, as is shown in the display part 13 in FIG. 2. In this way, it is confirmed that the subordinate object is in the focal depth range.

Further, when the output voltage V7 of the D-A converter 59 is VK, the outputs of the operational amplifiers $96_1$–$96_7$ are high in level, while the outputs of the operational amplifiers $96_8$ and $96_9$ are low in level. Thus, the transistor $97_8$ is brought into the closed state so as to light up the LED $94_8$, while the other LED's $94_4$–$94_7$ remain unlit. Thus, it is confirmed that the subordinate object is outside of the focal depth range. In this case, the aperture value is reset, or the distance is set close to the subordinate object, or the lens is exchanged so that the subordinate object comes into the focal depth range.

As is explained in detail, in the case of the display device in accordance with the present invention, various information necessary for taking a suitable picture can be displayed clearly in the viewfinder. The relation of the shutter time to the safe manual camera holding range, the relation of the exposure amount to the latitude, and the relation of the photographic lens to the focal depth of the mounted lens can be all readily recognized. In comparison with the conventional information display in the viewfinder, the photographic efficiency is much improved in its convenience, which is quite effective.

In the above-mentioned embodiment, the LED's for the display circuits 28 and 29, those for the display circuits 30 and 31 and those for the display circuits 32 and 33 are shared respectively. Obvious, the present invention is not necessarily limited to this embodiment; the LED's can be provided separately. Further, in the case of separate LED's, the LED's for the one display circuit and those for the other must be arranged side by side. Here, LED's are used as display elements; however, such elements as liquid crystals can also be used. Any display element will do. Further, the display elements can be arranged not only in the viewfinder but also outside the camera.

Further, for the aforementioned embodiment, the shutter time is set by means of the shutter time setting dial, and the set shutter time value is displayed. Again, the present invention is not limited to the above embodiment. The shutter time can be obtained from calculation and this value can be displayed. Further, although in this embodiment, the safe manual camera holding range is set in accordance with the focal length of the interchangeable lens, it also may be set manually. In this case, the variable resistor R11 is manually adjusted.

What is claimed is:

1. Information display device for camera comprising:
a first signal producing means for producing the exposure amount allowance range signals;
a first comparing means of a plural number of steps for comparing the exposure amount allowance range signals from the first signal producing means in a stepped way, some of the plural number of steps of the first comparing means producing a first signal for display, the above exposure amount allowance range signals being taken for standard;
a first display means for separately displaying the exposure amount allowance range and the range outside of the exposure amount allowance range by means of the above first signal;
a second signal producing means for producing a signal in accordance with the exposure amount;
a second comparing means of a plural number of steps for comparing the exposure value signal in a stepped way, certain determined steps out of the plural number of steps of the second comparing means producing a second signal for display; and
a second display means for displaying the exposure value by means of the second signal, the second display means display whether the exposure amount is in the exposure amount allowance range or not in accordance with whether the display of the second display means is in the exposure amount allowance range of the first display means or not.

2. Information display device for camera in accordance with claim 1, wherein the first display means and the second display means include respectively a plural number of display elements in common.

3. Information display device for camera in accordance with claim 1, wherein the exposure amount allowance range signal of the first signal producing means is adjustable in accordance with the setting operation of the film sensitivity setting means.

4. Information display device for camera comprising:
a first signal producing means for producing the focal depth allowance range signals;
a first comparing means of a plural number of steps for comparing the focal depth allowance range signal from the first signal producing means in a stepped way, some of the steps out of the above plural number of steps of the first comparing means producing a first signal, the above focal depth allowance range signals being taken for standard;
a second signal producing means for producing a signal in accordance with the distance up to the object;
a second comparing means of a plural number of steps for comparing the distance signal from the second signal producing means in a stepped way, certain determined steps out of the plural number of steps of the second comparing means in accordance with the distance signal producing a second signal;
a second display means for displaying the distance in accordance with the second signal, whereby whether the focal depth is in the focal depth allowance range or not is displayed in accordance with whether the display of the second display means is in the focal depth allowance range of the first display means or not.

5. Information display device for camera in accordance with claim 4, wherein the first display means and the second display means respectively include a plural number of display elements used in common.

6. An information display device for a camera, comprising:
first signal producing means for producing information signals corresponding to a given one of a plurality of information values;
first display means having a plurality of display elements corresponding to one of the information values for given ones of the display elements corresponding to the given one of the information values which corresponds to the information signals from said first signal producing means;
second display means having a plurality of display elements corresponding to the plurality of display elements of the first display means for placing a given number of display elements of said plurality of display elements of the second display means consecutively in a display state corresponding to an allowance range signal;
second signal producing means for producing an allowance range signal corresponding to an allowance range of the certain information value and for applying the allowance range signal to said second display means; and
correspondence means to have the plurality of display elements of the first display means and the plurality of display elements of the second display means correspond to each other and for displaying whether the given display elements being displayed in the first display means is within the range of the given number of display elements being consecutively displayed in the second display means.

7. A device according to claim 6, wherein the correspondence means are arranged to have a plurality of display elements of the first display means and a plurality of display elements of the second display means used in common.

8. A device according to claim 6, wherein the correspondence means are arranged to have a plurality of display elements of the first display means and a plurality of display elements of the second display means provided separately.

9. A device according to claim 6, wherein a plurality of display elements of the first display means and a plurality of display elements of the second display means are displayed within a viewfinder.

10. An information display device for a camera, comprising:
first signal producing means for producing a shutter time signal corresponding to a given one of a plurality of shutter time values;
first comparing means having a plurality of steps for stepwise comparing the shutter time signal from said first signal producing means and for producing a display signal from given steps of the plurality of steps corresponding to the shutter time signal;
first display means having a plurality of display elements corresponding to each of the shutter time values for placing the display elements corresponding to the certain shutter time value in a display state with a display signal of the first display means;

second signal producing means for producing a safe manual camera holding limit signal corresponding to a shutter limit in which a camera can be manually held;

second comparing means having a plurality of steps for stepwise comparing the safe manual camera holding limit signal from the second signal producing means and for producing a display signal for each step above a certain step corresponding to the safe manual camera holding limit signal;

second display means having a plurality of display elements corresponding to the plurality of display elements of the first display means for placing each display element above the shutter time of the safe manual camera holding limit in a display state with the display signal from each step of the second comparing means; and correspondence means having a plurality of display elements of the first display means and a plurality of display elements of the second display means correspond to each other and for displaying whether the display elements displayed in the first display means are within the range of each display element being displayed in the second display means.

11. A device according to claim 10, wherein said means having the display elements correspond are to have a plurality of display elements of the first display means and a plurality of display elements of the second display means used in common.

12. A device according to claim 11, wherein the plurality of display elements are respectively light emitting diodes, and means for causing one diode to light more brightly than the others when the one of the light emitting diodes of the first display means lights up within a range of each light emitting diode being lighted up in the second display means.

13. A device accoding to claim 10, wherein the second signal producing means are adjustable and wherein a value of a safe manual camera holding limit signal can be changed by adjusting said second signal producing means.

14. A device according to claim 13, wherein the second signal producing means are adjustable corresponding to a focal distance of an interchangeable lens.

15. A device according to claim 10, wherein the first signal producing means are adjustable corresponding to a shutter time setting operation.

16. An information display device for a camera, comprising:
first signal producing means for producing signals corresponding to an exposure value;
first comparing means having a plurality of steps for stepwise comparing signals from said first signal producing means and for producing display signals from a prescribed step out of a plurality of steps corresponding to the signals of the first signal producing means;
first display means having a plurality of display elements corresponding to each exposure value, said display means placing a display element corresponding to a certain exposure value in a display state with the display signal from the first comparing means;
second signal producing means for producing exposure amount allowance range signals;
second comparing means having a plurality of steps for stepwise comparing the exposure amount allowance signals from the second signal producing means and for producing a display signal from a given consecutive number of steps of the plurality of steps corresponding to the exposure amount allowance range signals;
second display means having a plurality of display elements corresponding to the plurality of display elements of the first display means for placing a given number of display elements in a display state consecutively with a display signal from a given number of steps of the second comparing means; and
correspondence means having a plurality of display elements of the first display means and a plurality of display elements of the second display means correspond to each other and for displaying whether the display elements displayed in the first display means fall within the range of respective display elements displayed in the second display means.

17. A device according to claim 16, wherein the correspondence means are arranged to make the plurality of display elements of the first display means and the plurality of display elements of the second display means usable in common.

18. A device according to claim 16, wherein the second signal producing means can adjust the exposure amount allowance range signals according to a film sensitivity setting operation.

19. An information display device for a camera, comprising:
first signal producing means producing a distance signal corresponding to a distance to an object;
first comparing means having a plurality of steps for stepwise comparing the distance signals from the first signal producing means and for producing a display signal from a prescribed step out of the plurality of steps corresponding to the distance signals;
first display means having a plurality of display elements corresponding to a distance to be displayed and for placing the display elements corresponding to the object distance in a display state with the display signals of the first comparing means;
second signal producing means for producing focal depth allowance range signals;
second comparing means having a plurality of steps for stepwise comparing the allowance range signals from the second signal producing means and for producing display signals from a given consecutive number of steps out of the plurality of steps corresponding to the allowance range signals;
second display means having a plurality of display elements corresponding to the plurality of display elements of the first display means and for placing a certain number of display elements in a display state consecutively with the display signals from a given number of steps of the second comparing means; and
means to have a plurality of display elements of the first display means and a plurality of display elements of the second display means correspond to each other and for displaying whether the display elements displayed in the first display means fall within the range of each display element being displayed in the second display means.

20. A device according to claim 19, wherein the means to have the display elements correspond are arranged to make the plurality of display elements of the first display means and the plurality of display elements of the second display means usable in common.

* * * * *